United States Patent [19]
Bunn, Jr. et al.

[11] 3,963,603
[45] June 15, 1976

[54] FLUID CATALYTIC CRACKING

[75] Inventors: Dorrance P. Bunn, Jr.; H. Blandin Jones, both of Houston, Tex.

[73] Assignee: Texaco Inc., New York, N.Y.

[22] Filed: Nov. 11, 1974

[21] Appl. No.: 522,394

Related U.S. Application Data

[60] Continuation-in-part of Ser. No. 368,165, June 8, 1973, abandoned, which is a division of Ser. No. 182,030, Sept. 20, 1971, Pat. No. 3,784,360.

[52] U.S. Cl. ............................. 208/164; 23/288 S
[51] Int. Cl.² ......................................... C10G 9/32
[58] Field of Search ................................. 208/164

[56] References Cited
UNITED STATES PATENTS

| | | | |
|---|---|---|---|
| 3,213,014 | 10/1965 | Atkinson et al. | 208/164 |
| 3,316,170 | 4/1967 | Stewart et al. | 208/164 |
| 3,410,793 | 11/1968 | Stranahan et al. | 208/164 |
| 3,448,037 | 6/1969 | Bunn et al. | 208/164 |
| 3,619,415 | 11/1971 | Jones et al. | 208/164 |

Primary Examiner—Herbert Levine
Attorney, Agent, or Firm—T. H. Whaley; C. G. Ries; Douglas H. May, Jr.

[57] ABSTRACT

A fluidized catalytic cracking process wherein the reaction zone comprises one or more riser reaction conduits discharging into a reaction vessel. Hydrocarbon vapors and catalyst discharging from the risers separate to form a dense phase fluidized catalyst bed and a hydrocarbon vapor phase within the reaction vessel. A selected weight inventory of catalyst is maintained in the reaction vessel dense phase catalyst bed by valve means responsive to the weight of catalyst. Conversion of hydrocarbon in the reaction vessel may be increased by reducing the dense phase catalyst bed bulk density and consequently increasing contact of catalyst with hydrocarbon vapor within the reaction vessel.

10 Claims, 2 Drawing Figures

FLUID CATALYTIC CRACKING

This application is a continuation-in-part of application, Ser. No. 368,165, filed June 8, 1973 now abandoned which in turn is a divisional application of Ser. No. 182,030 filed Sept. 20, 1971 now U.S. Pat. No. 3,784,360.

BACKGROUND OF THE INVENTION

This invention relates to methods and apparatus for fluid catalytic cracking of hydrocarbon oils. More particularly this invention relates to methods wherein catalyst and hydrocarbon vapor discharge from one or more riser reactors into a reaction vessel containing a selected weight of dense phase fluidized catalyst. Hydrocarbon conversion in the reaction vessel, in addition to that obtained within the riser reactors, is controlled by increasing and decreasing the volume of dense phase catalyst bed such that contact of hydrocarbon vapor with catalyst is increased or decreased to obtain the desired degree of cracking.

In fluid catalytic cracking processes, hydrocarbon oils are contacted in one or more reaction zones with cracking catalyst under conditions such that a portion of the hydrocarbon oils are converted into lower boiling products. During the hydrocarbon conversion, coke is deposited upon the catalyst. After contact with the hydrocarbon charge, coke contaminated catalyst is removed from the reaction zone, from which it may be transferred to a stripping zone. In the stripping zone, volatile hydrocarbons entrained within, or occluded upon, the catalyst are vaporized employing a stripping vapor, such as steam. Stripping vapors and vaporized hydrocarbons are transferred from the stripping zone into the reaction zone from which they are subsequently recovered as components of the reaction zone hydrocarbon product. Stripped catalyst from the stripping zone is transferred to a regeneration zone wherein at least a portion of the coke is removed by burning with an oxygen containing gas, thus regenerating and restoring catalytic activity to the catalyst. Regenerated catalyst from the regeneration zone is returned to the reaction zone for contact with additional hydrocarbon oils.

According to one method for cracking hydrocarbons, regenerated catalyst and hydrocarbon charge are combined near the bottom of an elongated riser reactor conduit under catalytic cracking conditions. The resulting catalyst-hydrocarbon vapor mixture flows upward in the riser as a dilute suspension of catalyst in hydrocarbon vapor, and the mixture is subsequently discharged into a reaction vessel. In the reaction vessel, hydrocarbon vapors and catalyst separate, forming a dense phase fluidized catalyst bed and a hydrocarbon vapor phase containing minor amounts of suspended catalyst. In this method of cracking hydrocarbon oils, one or more risers may be employed. For instance, in U.S. Pat. Nos. 3,394,076 and 3,433,733, fluid catalytic cracking methods are described when two riser reactors are employed. According to the methods of the referenced patents, fresh hydrocarbon charge in a first riser is combined with regenerated catalyst for reaction therein, and in the second riser recycle oil, comprising relatively high boiling components obtained from the cracked hydrocarbon products of the catalytic cracking reaction, is combined with regenerated catalyst and subjected to additional cracking. Both risers discharge into the reaction vessels wherein a dense phase bed of catalyst is maintained in a fluidized state by the passage of hydrocarbon vapors and fluidization vapors therethrough. Above the dense phase there is a dilute phase which has a catalyst concentration of only about 0.15 to about 0.75 pounds per cubic foot. Hydrocarbon vapors entering the reaction zone via the riser or risers provided a substantial proportion of the vapors required to maintain the dense phase catalyst bed in a fluidized state. Additional fluidization vapors, which may comprise primary stripping steam or other gases, are added near the bottom of the dense phase bed for separating a portion of occluded hydrocarbons from the catalyst and maintaining the dense phase bed in a fluidized state. Catalyst is continuously discharged from the risers into the reaction vessel, and is continuously withdrawn drom the dense phase fluidized bed in order to maintain a desired volume inventory of catalyst within the reaction vessel. Generally, bulk density of the fluidized dense phase catalyst bed is maintained about constant in the range of about 38-35 lb/cu.ft. by addition of fluidization vapors near the bottom of the reaction vessel. The proportion of hydrocarbon conversion obtained in the reaction vessel is determined by the degree of contact of hydrocarbon vapors with catalyst in the dense phase fluidized bed. Thus, according to these prior art methods the volume of dense phase is decreased or increased to increase or decrease hydrocarbon conversion within the reaction vessel.

According to the methods of the prior art, an inventory of dense phase catalyst within the reaction vessel is maintained at a selected value by measuring the pressure differential between a point above the upper surface of the dense phase fluidized bed and a second point below said upper surface and controlling the rate at which catalyst is withdrawn from the dense phase fluidized bed to maintain the measured pressure differential at a preselected value. This method for controlling the dense phase catalyst inventory measures weight of catalyst in the dense phase fluidized bed. An increase or decrease in dense phase catalyst inventory is measured by an increase or decrease in the measured pressure differential, since it is not common practice to vary the catalyst dense phase bulk density as a control parameter. Thus, for control of hydrocarbon cracking within the reaction vessel, the weight inventory of catalyst is increased or decreased to obtain increased or decreased contact of hydrocarbon with catalyst therein. Changing the weight inventory of catalyst within the reaction vessel, to obtain a desired degree of hydrocarbon conversion within the reaction vessel, requires that substantial amounts of catalyst be transferred into or out of the reaction vessel.

Coke deposited upon the catalyst within the dense phase fluidized bed in the reaction vessel adversely affects the catalytic activity of the catalyst. Also, even where primary stripping steam is provided in the reaction vessel, such dense phase catalyst has appreciable amounts of volatile relatively high boiling hydrocarbon liquids occluded thereon. Thus, catalyst removed from the reaction vessel is commonly stripped of volatile hydrocarbons in a stripping zone, then passed into a regeneration zone wherein coke and any other combustible materials are removed by burning with an oxygen containing gas, such as air. The removal of coke and combustible materials from the catalyst restores its catalytic activity, thereby making it suitable for further use in the fluidized catalytic cracking process. Accordingly, catalyst withdrawn from the reaction vessel is passed through a stripping zone wherein it is intimately contacted with a stripping vapor, preferably steam. The major portion of volatile hydrocarbons occluded upon the catalyst are thereby vaporized and stripped from the catalyst. Stripping vapors and vaporized hydrocarbons are commonly passed into the reaction vessel at a point above the upper surface of the dense phase fluid catalyst bed, via a stripper vent line. By employing this means for handling stripper vapors and vaporized hydrocarbons, the vaporized hydrocarbons may be conveniently recovered along the hydrocarbon products from the reaction vessel. Additionally, by passing such vapors from the secondary stripping zone into the reaction vessel above the fluidized catalyst bed, the pressure differential between the reaction vessel and the stripping zone is limited to the pressure through the stripper vent line. This pressure drop is small and may be controlled by properly sizing the cross-sectional area of the stripper vent line. Therefore, since the pressure differential between the reaction zone and the stripping zone is small, removal of catalyst from the reaction vessel into the stripping zone is not complicated by large differences in pressures between the two zones.

SUMMARY OF THE INVENTION

Now, according to the present invention an improved method is disclosed for controlling hydrocarbon cracking in the reaction vessel of a fluidized catalytic cracking process wherein regenerated catalyst and hydroarbon charge are contacted in the lower portion of one or more elongated riser reaction zones; wherein the catalyst-hydrocarbon vapor mixture discharges in a downward direction from the upper discharge end of said riser reaction zone into a vertically oriented reaction vessel at a point intermediate to the height of said reaction vessel; wherein catalyst and hydrocarbon vapor in said reaction vessel separate into a dense phase fluidized catalyst bed having a bulk density from about 18 to about 35 pounds per cubic foot, and a hydrocarbon phase having a dilute suspension of catalyst therein and having a bulk density of from about 0.15 to 0.75 pounds per cubic foot; wherein hydrocarbon vapors substantially free of catalyst are recovered overhead from said reaction vessel; wherein fluidization vapor is injected near the bottom of said reaction vessel for fluidizing said dense phase catalyst bed; and wherein catalyst from near the bottom of said dense phase catalyst bed is transferred via valve means responsive to the weight of catalyst in said dense phase fluidized bed from said reaction vessel at a rate equivalent to the rate catalyst enters said reaction vessel.

The improvement of the present invention comprises maintaining a selected weight of catalyst inventory in said dense phase fluidized catalyst bed by action of said valve means responsive to weight of catalyst inventory, such that at a bulk density of about 35 pounds per cubic foot (lb./cu.ft.) the upper surface of said dense phase fluidized catalyst bed is in the range of about 3 to 7 feet below the discharge of said riser reaction zone, and at a bulk density of about 18 lb/cu.ft. the upper surface of said dense phase fluidized catalyst bed is above the discharge of said riser reaction zone; and adjusting the bulk density of said dense phase fluidized catalyst bed within the range of from about 18 to 35 lb/cu.ft. for obtaining the desired degree of conversion of hydrocarbon in said reaction vessel. Bulk density of the dense phase fluidized catalyst bed is adjusted within the range of about 18–35 lb./cu. ft. by adjusting the flow rate of fluidization vapor to obtain superficial vapor velocities in the range of about 2–3.4 ft./sec. in the dense phase fluidized bed.

By employing the improvement of the present invention, conversion of hydrocarbons within the reaction vessel may be selectively adjusted over a substantial range by adjusting catalyst bulk density without changing operating conditions such as catalyst to oil ratio, reaction zone temperature, hydrocarbon charge preheat, etc. and particularly without changing the weight inventory of catalyst in the reaction vessel. Thus, the method of the present invention provides means for controlling hydrocarbon conversion in the reaction vessel by adjusting contact of hydrocarbon vapor with dense phase catalyst without the disadvantage of transferring large amounts of catalyst into and out of the reaction vessel. The improved method of the present invention may be practiced on new units designed therefor and upon existing units employing one or more riser reaction zones discharging into a reaction vessel. These and other advantages will be more completely discussed in the detailed description of the invention which follows.

DETAILED DESCRIPTION OF THE INVENTION

Figure 1:
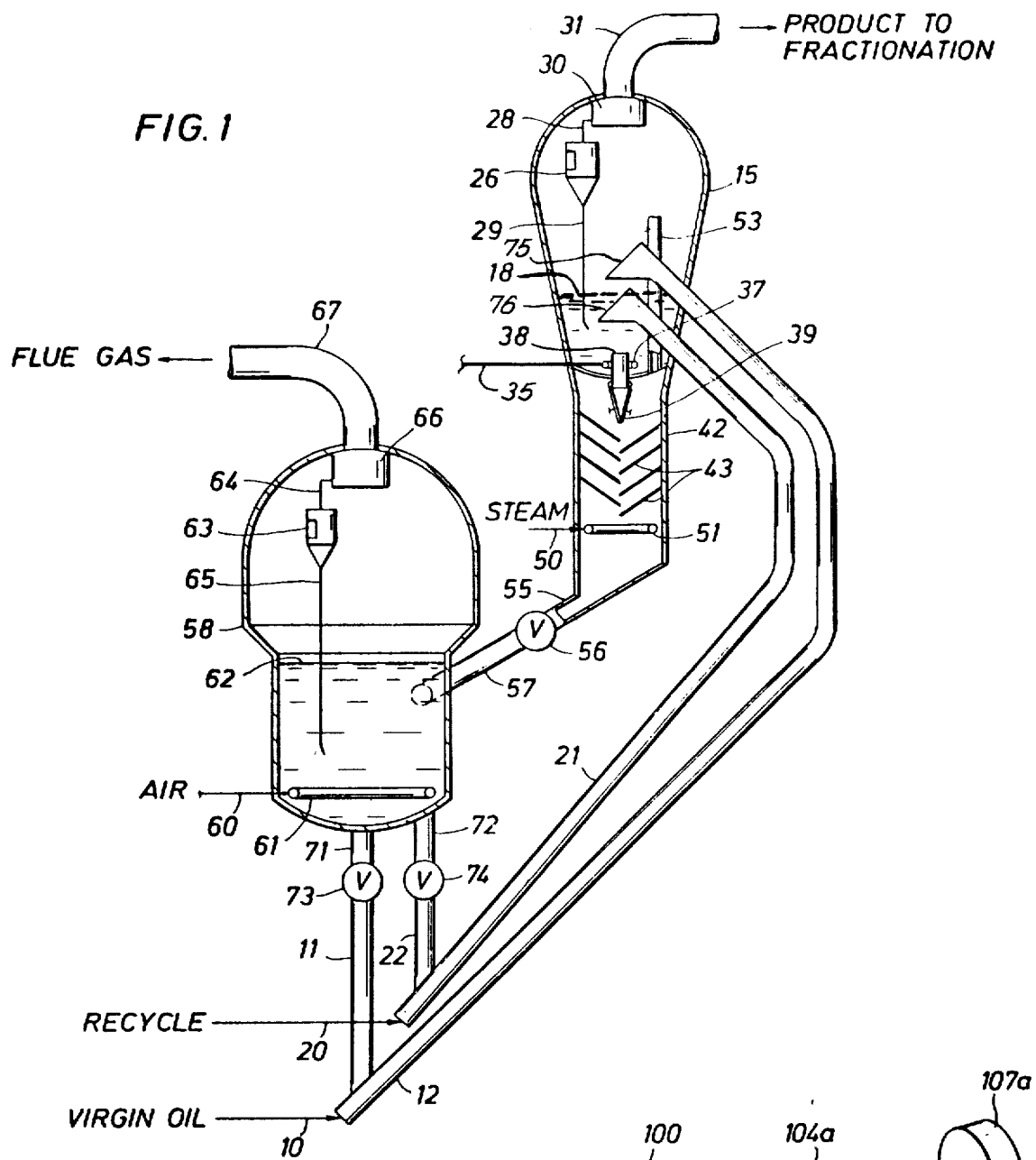
FIG. 1 of the drawing is a schematic diagram of a fluidized catalytic cracking process employing the improvement of the present invention.

Fresh hydrocarbon charge stocks within contemplation of the present invention include petroleum fractions, shale oils, tar sand oils, etc. which are susceptible to conversion by catalytic cracking into useful lower boiling hydrocarbon products. Preferably, fresh charge stocks are distillate fractions boiling in the range of about 650°F–1050°F, although lighter and heavier fractions, such as heavy naphthas, light gas oils, topped crudes, atmospheric residuum fractions, etc., may also be employed in the process of the present invention. In addition to fresh, or virgin, hydrocarbon charge stocks, it is common practice in fluid catalytic cracking to recycle hydrocarbon streams for additional conversion. Thus, it is within the contemplation of the present invention that recycle charge stocks such as heavy cracked naphthas, intermediate cycle gas oils, heavy cycle gas oils, etc. be recycled to the cracking zone for further conversion. It is well known that recycle stocks, separated from the fluid cracked products and returned to the cracking zone for further conversion, are more refractory than virgin charge stocks of similar boiling range. Consequently, it is common practice to crack such recycle stocks under different conditions than cracking conditions employed for virgin charge stocks.

Modern cracking catalyst, particularly those cotaining ion exchanged silica-alumina zeolitic molecular sieves, having increased cracking activity and increased selectivity for conversion of hydrocarbon charge stocks into liquid products, particularly naphtha, at the expense of gaseous products and coke. such zeolitic molecular sieve catalyst are preferred in the practice of the present invention. With such modern catalysts it is recognized that short periods of good contact between hydrocarbon charge vapors and regenerated catalyst results in superior yields of desirable liquid products as compared to yields obtained as a result of longer periods of poor contact between hydrocarbon charge and regenerated catalyst. Consequently, in the process of the present invention, one or more dilute phase riser reaction zones are contemplated wherein hydrocarbon vapors and regenerated catalyst are contacted for a period in the range of about 0.5–10 seconds under flow conditions such that superficial vapor velocities in the risers are in the range of about 30–65 ft/sec., and such that catalyst is suspended as a dilute phase within the flowing hydrocarbon vapors. Flow conditions in the riser reaction zones are such that very little or no backmixing of catalyst occurs. Reaction conditions in the riser reaction zones include temperatures in the range of about 850°–1150°F, pressures of about 10–50 psig, superficial vapor velocities in the range of about 30–65 ft/sec., residence times of about 0.5–10 sec., and catalyst to oil weight ratios in the range of about 2–20. In the present invention, at least the fresh hydrocarbon charge is contacted with regenerated catalyst in such a riser reaction zone. Preferably, recycle stocks are also contacted with regenerated catalyst in one or more separate riser reaction zones. However, this latter preference is not necessary to the present invention. Alternatively, recycle charge stocks may be contacted with regenerated catalyst in the same riser reaction zone as the virgin charge stock, or may be charged directly to the dense phase fluidized catalyst bed contained in the reaction vessel.

Catalyst and hydrocarbon vapor from the riser reaction zones discharge downwardly into the reaction vessel intermediate to the height of said vessel. In the case where more than one riser reaction zone is employed, it is preferred that the virgin charge stock riser discharge at a point in the reaction vessel above the discharge of the recycle riser reaction zone.

Hydrocarbon vapor and catalyst discharging from the riser into the reaction vessel separate into a dense phase fluidized catalyst bed having a bulk density in the range of about 18–35 lb./cu. ft. and into a hydrocarbon vapor phase containing suspended catalyst and having a bulk density in the range of about 0.15–0.75 lb/cu ft. The hydrocarbon vapor passes upward, through one or more stages of cyclones for removal of entrained catalyst, and thence out of the reaction vessel into a product recovery zone wherein the various desired product fractions and recycle fractions are obtained from the cracked hydrocarbon vapors. Catalyst from the cyclone separators is returned to the dense phase catalyst bed.

The catalyst in the dense phase catalyst bed is maintained in a fluidized state by the flow of hydrocarbon vapors entrained therein, and by the action of fluidization gas, preferably steam, added near the bottom of the reaction vessel. For operability of the present invention, it is required that a distinct density transition exist between the dense phase fluidized catalyst bed and the dilute hydrocarbon phase in the reaction vessel. Experience with cracking catalyst has shown that fluidized beds of cracking catalysts cannot be maintained by the upward passage of vapors through the catalyst at superficial vapor velocities below about 0.2 ft/sec., and such air rated beds of cracking catalyst are at a stage of incipient fluidization. For cracking catalyst generally, bulk density of incipiently fluidized beds is about 40 lb/cu.ft. For air rated beds of catalyst wherein the superficial vapor velocities are in the range of about 0.2 to about 2 ft/sec., the catalyst is fluidized, and the bulk density is decreases only very slowly, that is from about 40 to about 35 lb/cu.ft. as the superficial vapor velocity increases within this range. The properties of fluidized beds of cracking catalyst including the high degree of mixing within the bed, and the discrete upper surface, similar to agitated liquids are well known and understood by those skilled in the arat. At about 2.0 ft/sec., an increase in superficial vapor velocity results in a proportionally larger decrease in fluidized catalyst bulk density. Thus, in the superficial vapor velocity range of from about 2.0 to about 3.4 ft/sec., bulk density of a fluidized cracking catalyst bed decreases from about 35 lb/cu.ft. to about 18 lb./cu.ft. Within the superficial vapor velocity range of about 2–3.4 ft/sec., the fluidized catalyst bed maintains its properties of good mixing within the bed and a discrete upper surface. As superficial vapor velocities increase above about 3.4 ft/sec., a fluidized catalyst bed gradually loses its liquid like properties, particularly the discrete upper surface, and catalyst particles become progressively more entrained in the flowing vapor and back mixing of catalyst within the bed decreases until finally, at superficial vapor velocities of about 10 ft/sec. the fluidized catalyst bed as such ceases to exist and becomes a suspension of catalyst in flowing vapor.

Above the upper surface of most fluidized catalyst beds, catalyst fines are suspended in the vapor disengaging the bed. These catalyst fines are carried upward with the flowing vapor, creating the dilute catalyst suspension in the hydrocarbon phase within the reaction vessel. As hereinabove described, these catalyst fines are separated from the dilute phase existing the reaction vessel in solid-vapor separation devices such as cyclones, and the catalyst fines are returned to the dense phase fluidized catalyst bed.

Operating conditions within the reaction vessel which are within contemplation of the present invention include temperatures in the range of about 850°–1150°F, and dilute phase pressures in the range of about 10–15 psig. Substantial changes in the depth of the dense phase catalyst bed which result in changed contact of hydrocarbon and catalyst may result in substantial changes in hydrocarbon conversion. For example, if the dense phase bed depth is increased to cover the discharge of a riser reaction zone, contact of the discharging hydrocarbon vapor with catalyst is increased, resulting in increased conversion of hydrocarbon into lighter hydrocarbons and coke. On the other hand, as depth of the dense phase catalyst bed is decreased, contact of the discharging hydrocarbon vapor with catalyst is decreased, resulting in reduced hydrocarbon conversion in the reaction vessel. As catalyst bed depth is changed, however, hydrocarbon conversion in the riser reaction zones remains unaffected.

In methods of the prior art, when operating a fluid catalytic cracking process such as is described herein, superficial vapor velocities in the dense phase fluidized catalyst bed below riser discharges are maintained at a value below about 2.0 ft/sec. and generally about 1.5–1.7 ft/sec. At such superficial vapor velocities, the bulk density (and consequently volume of the catalyst bed) does not change much with a change in superficial vapor velocity. Generally, for superficial vapor velocities in the range of about 0.2–2.0 ft/sec. the bulk density of fluidized catalytic cracking catalyst is in the range of about 35–38 lb/cu.ft. In such processes of the prior art, depth of the dense phase catalyst bed is determined by measuring a pressure differential in the reaction vessel from a point above the upper surface of the dense phase bed to a point below the surface of the dense phase bed. As bulk density of the dense phase fluidized catalyst bed is about constant at the superficial vapor velocities employed in the fluidized catalyst beds, this pressure differential is used to indicate the depth of the dense phase catalyst bed within the reaction vessel. Substantial changes in dense phase catalyst bed depth over short periods of time, as means for controlling hydrocarbon conversion, require transfer of large amounts of catalyst into and/or out of the reaction vessel. Although the regeneration zone may have capacity for some amount of catalyst, generally if the change in bed depth is very great catalyst must be transferred into our out of the process. Thus, requiring large auxillary facilities for transfer and storage of catalyst.

According to the method of the present invention, an improved catalytic cracking process is disclosed wherein dense phase bed fluidized catalyst inventory within a reaction vessel is maintained constant employing improved valve means for transferring catalyst from the bottom of a reaction vessel to a stripping zone at substantially the same rate catalyst enters the reaction vessel from a downwardly directed riser reaction zone discharge. Bulk density of the dense phase catalyst bed is adjusted by adjusting flow rate of fluidization gas, to increase or decrease depth of the dense phase catalyst bed. Thus, providing an additional parameter for controlling hydrocarbon conversion in the fluidized catalytic cracking process.

In the invention, a weight of dense phase catalyst inventory is selected such that, at bulk density of about 35 lb/cu.ft. the upper surface of the dense phase bed is below a downwardly directed riser discharge. Preferably, at a bulk density of 35 lb/cu.ft. the upper surface of the fluidized dense phase catalyst bed will be from 3 to 7 feet below the riser discharge. Then, as its bulk density is decreased through the range of about 35 lb/cu.ft. to about 18 lb/cu.ft., the upper surface of the dense phase catalyst bed will rise to and cover the riser discharge. In the case where more than one riser discharges into the reaction vessel at different elevations, the weight of catalyst inventory may be selected to cover one or more riser discharges, as desired. This selected weight inventory of catalyst is maintained in the reaction vessel by action of valve means responsive to the weight of catalyst in the dense phase fluidized catalyst bed. For adequate operation of the present invention, catalyst and hydrocarbon vapor are discharged downwardly from the riser, such that the hydrocarbon vapor will be increasingly contacted with the dense phase fluidized catalyst bed as its surface is raised toward the riser discharge elevation.

In operation, the bulk density of the dense phase fluidized bed below the riser discharge is controlled by adjusting the flow rate of fluidization vapor introduced into the lower portion of the reaction vessel to provide fluidized superficial vapor velocities in the range of about 1.5–3.4 ft/sec. and preferably in the range of about 2–3.4 ft/sec. As flow of fluidization vapor is increased, bulk density of the dense phase fluidized catalyst bed decreases causing an increase in volume and depth of the dense phase fluidized catalyst bed increases, the upper surface of the bed approaches the downwardly directed riser discharge, and contact of hydrocarbon vapor exiting the riser discharge with the dense phase catalyst bed increases. This increased contact of hydrocarbon vapor with dense phase fluidized catalyst results in increased hydrocarbon conversion within the reaction vessel.

Circulation within a fluidized bed of catalyst is high, being similar to boiling water. Thus hydrocarbon contacting the surface of the dense phase fluidized bed tends to be circulated through the bed. Thus, substantial conversion of the downwardly directed hydrocarbon exiting the riser discharge is obtained as the surface of the dense phase bed approaches the riser discharge and increases as more hydrocarbon contacts the surface the dense phase fluidized catalyst bed. As the surface of the dense phase catalyst bed contacts and passes above the riser discharge, substantially all the discharging hydrocarbon vapor is circulated through the bed for additional conversion. This hydrocarbon vapor circulated through the fluidized bed contributes to the superficial vapor velocity, along with the fluidization vapor charged to the lower portion of the reaction vessel. The superficial vapor velocity controls the bulk density of the fluidized catalyst bed. Thus, only small increases in fluidization vapor may be necessary to substantially decrease bulk density of the fluidized bed. For as contact of hydrocarbon vapor with the fluidized bed increases, hydrocarbon vapor circulating through the bed increases, contributing to an increase in the fluidized bed superficial vapor velocity. Thus, it is within contemplation of the present invention that fluidization vapor flow rate be used to control bulk density of the dense phase fluidized bed without necessarily providing all the vapor to maintain the catalyst bed in its desired fluidization state.

The method of the present invention may be better understood by reference to FIG. 1 of the drawing which figure illustrates one embodiment by which the method of the present invention may be practiced. It is not intended to restrict the invention by said FIG. 1, since modifications may be made within the scope of the claims without departing from the spirit thereof.

Referring to FIG. 1 of the drawing, virgin gas oil charge in line 10 is contacted with hot regenerated catalyst from standpipe 11 at a temperature of about 1200°F, in the inlet portion of a fresh feed riser 12. The resulting suspension of catalyst in oil vapor at a temperature of about 920°F. and at an average velocity of about 33 ft/sec. passes upward through fresh feed riser 12 and into reactor vessel 15. Fresh feed riser 12 terminates in a downwardly directed outlet nozzle 75, discharging above the upper surface 18 of a dense phase fluidized catalyst bed. Conditions prevailing in the fresh feed riser include a catalyst to oil weight ratio of 5.6:1 and a weight hourly space velocity of 69.5. At the vapor velocity in the fresh feed riser 12 of about 33 ft/sec. residence time is about 4.0 seconds. Substantial conversion of the virgin gas oil occurs in riser 12 and at these conditions amounts to a conversion of 32 percent of the virgin gas oil into products boiling below 430°F.

An intermediate cycle gas oil fraction, separated from the cracked product in fractionation equipment not shown, having a gravity of about 22° API and an initial boiling point temperature of about 725°F, is introduced through line 20 into the inlet section of a recycle riser 21 wherein it is contacted with hot catalyst from standpipe 22. The resulting catalyst-oil vapor mixture at a temperature of about 920°F passes upward through recycle riser 21 at an average velocity of about 28 feet per second with an average residence time of about 5.0 seconds. Other conditions in the recycle riser include a catalyst to oil weight ratio of 6.2:1 and a weight hourly space velocity of 51.8. About 18 percent of the gas oil recycle is converted to products boiling below 430°F by the time the products are discharged through the downwardly directed outlet nozzle 76 of recycle riser 21 into reaction vessel 15. The vapor effluent of recycle riser 21 is discharged below the surface of the dense phase fluidized catalyst bed maintained in reaction vessel 15, affecting further conversion of the recycle gas oil into 39 percent products boiling below 430°F. Other conditions in the dense phase bed in reactor 15 include a bulk density of 22 lb/cu.ft., a catalyst to oil ratio of 12.8:1 and a weight hourly space velocity of 3.0. The combined fresh feed riser cracking, recycle riser cracking and reactor bed cracking provide an overall conversion of 70 volume percent of the virgin gas oil into products boiling below 430°F. Vapor velocities in reactor vessel 15 are: 3.1 feet per second in the dense phase bed at the point at which the recycle riser 21 discharges; 4.5 ft/sec. at the point where the fresh feed riser 12 discharges and 1.5 ft/sec. in the upper portion of reactor vessel 15.

Cracked product vapor disengages the catalyst dense phase bed at its upper surface 18. The level of the dense phase bed 18 is maintained about 7 feet below the discharge of fresh feed riser 12, thereby allowing cracked vapors to disengage the catalyst without substantial contact with the dense phase which would result in increase conversion. The desired level of upper surface 18 of the dense phase bed is obtained by maintaining a constant weight of catalyst inventory within reactor vessel 15 and controlling the catalyst fluidization vapor velocity through said dense phase bed, as will hereinafter be further described.

Vapors and entrained catalyst passing upward through reactor vessel 15 enter cyclone 26 wherein entrained catalyst is separated from the vapors and returned to the catalyst bed through dip leg 29. Although a single cyclone is shown for clarity, it will be understood that several cyclones may be assembled in series to achieve substantially complete catalyst separation and a plurality of such assemblies may be employed to handle the volume of vapor encountered. Effluent vapors pass from cyclone 26 through line 28 into plenum chamber 30. From plenum chamber 30, vapors are discharged from reactor vessel 15 through line 31. Vapor line 31 conveys the hydrocarbon vapors to a fractional distillation zone, not shown, wherein the vapors are separated into desired product and recycle streams by methods well known in the art.

Steam in line 35 is passed to steam ring 37 and discharges near the bottom of reactor vessel 15 at a point just below the inlet of catalyst withdrawal standpipe 38. The steam discharged from steam ring 37 and the recycle hydrocarbon vapors discharged from recycle riser 21 provide a fluidized catalyst bed superficial vapor velocity of about 3.1 ft/sec. for maintaining the dense phase catalyst bed in a fluidized state at a bulk density of about 22 lb/cu.ft. At a selected recycle gas oil vapor rate, upper surface 18 of the dense phase catalyst bed may be adjusted while maintaining a constant dense phase catalyst bed inventory in reactor vessel 15 by adjusting the rate of steam discharge through steam ring 37.

Dense phase catalyst in the lower portion of reactor 15 passes downwardly through standpipe 38 and counter-weighed check valve 39 into stripping zone 42.

Catalyst valve 39 is equipped with counter-weights arranged to exert a closing force upon the valve. The weight of catalyst collected in standpipe 38 and in the dense phase bed exert an opening force upon catalyst valve 39. In the operation of a fluidized catalyst cracking process, the inventory of catalyst as discharged from the risers 12 and 21 will increase in the reactor vessel 15 until the head of catalyst above catalyst valve 39 overcomes the closing force exerted by the counter-weights. When the head of catalyst balances the force of the counter-weights, additional catalyst added to reactor vessel 15 will cause catalyst valve 39 to open and allow catalyst to pass from reaction vessel 15 to stripping zone 42 thereby restoring the balance between the head of catalyst above catalyst valve 39 and the closing force of the counter-weights. In the operation of a fluidized catalytic cracking process wherein catalyst is continuously entering reaction vessel 15, catalyst valve 39 continuously passes catalyst from the reaction vessel 15 to stripping zone 42, thus maintaining a constant weight of catalyst inventory in reactor vessel 15.

In stripping zone 42, baffles are attached to the wall of said stripping zone 42. Steam in line 50 is discharged through steam ring 51 into the lower portion of stripping zone 42 below baffles 43. Steam rising through stripping zone 42 vaporizes and separates occluded and entrained hydrocarbons from the catalyst entering stripping zone 42 via catalyst valve 39. Steam and vaporized hydrocarbons pass upwardly from stripping zone 42 through stripper vent line 53, discharging into the upper portion of reactor vessel 15 above the fluidized catalyst dense phase bed.

Stripped catalyst is withdrawn from the bottom of stripping zone 42 through a spent catalyst standpipe 55 at a rate controlled by slide valve 56 and discharges through standpipe 57 into regenerator 58. In regenerator 58 the spent catalyst is contacted with air conducted through line 60 and air ring 61 whereupon coke is burned and the catalytic activity of the spent catalyst is restored. Catalyst undergoing regeneration in regenerator 58 forms a dense phase bed having a level 62. Flue gas resulting from coke burned from the surface of the catalyst passes upwardly through regenerator 58 and enters cyclone 63 wherein entrained catalyst is separated from the flue gas and is returned to the regenerator dense phase catalyst bed through dip leg 65. Cyclone 63, although represented as a single vessel may, of course, comprise an assembly of cyclones arranged in parallel and in series to effect substantially complete separation of entrained solids from the flue gas. Effluent flue gas from cyclone 63 passes through line 64 into plenum chamber 66. From plenum chamber 66 the flue gas exits regenerator vessel 58 through flue gas line 67 to vent facilities, not shown.

Regenerated catalyst is withdrawn from the bottom of regenerator 58 through lines 71 and 72 at rates controlled by slide valves 73 and 74 to supply hot regenerated catalyst to standpipes 22 and 11 as described above.

To demonstrate further the method of the present invention, operation of the fluid catalytic cracking unit is continued as described above. However, steam flow from line 35 through steam ring 37 is reduced such that superficial vapor velocity in the dense phase fluidized catalyst bed is reduced to 2.0 ft/sec. Upon this reduction in steam flow, bulk density of the dense phase fluidized catalyst bed increases from 22 lb/cu.ft. to 35 lb/cu.ft., causing upper surface 18 of the dense phase fluidized catalyst bed to fall about 5 feet below discharge nozzle 76 of recycle riser 21. Thus, by following this mode of operation, conversion of virgin gas oil in fresh feed riser 21 remains at 32 percent, and conversion of recycle gas oil in recycle riser 21 remains at 16 percent. Howevers, since the recycle hydrocarbon vapor now discharges above upper surface 18 of the dense phase fluidized catalyst bed, further conversion of recycle gas oil in reaction vessel 15 is reduced to an overall conversion into products boiling below 430°F of 26 percent. This results in an overall virgin gas oil conversion of 58 volume percent into products boiling below 430°F. Thus, by increasing the bulk density of the dense phase fluidized catalyst bed by the simple expedient of decreasing the flow rate of fluidization steam through line 35 and ring 37, the overall conversion of virgin gas oil is reduced from 70 volume percent to 58 volume percent products boiling below 430°F. This significant decrease in conversion is obtained without changing other operating parameters. Also, the weight inventory of catalyst in the reaction vessel remains unchanged.

Figure 2:
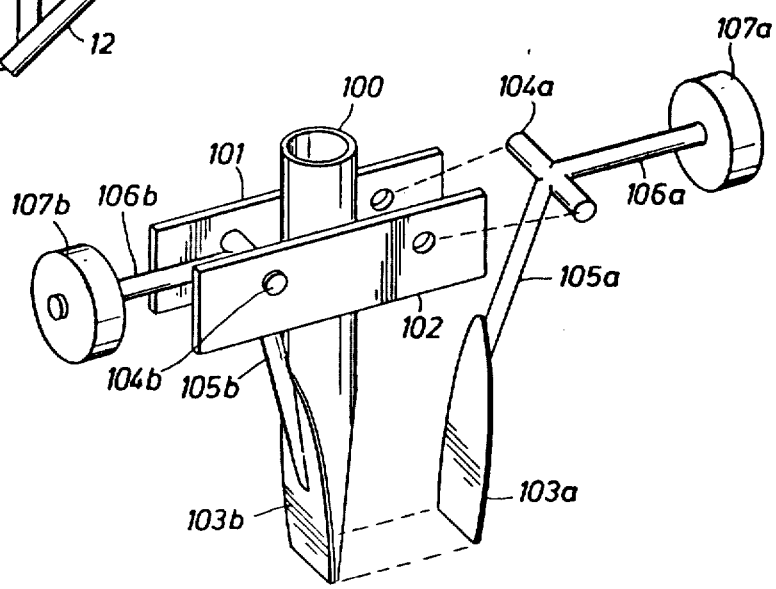
FIG. 2 of the drawing is a schematic drawing in cross-section showing in more detail a portion of the system of FIG. 1.

FIG. 2 of the drawings illustrates in detail a catalyst valve which may be employed in the practice of the present invention and it is not intended to restrict the invention thereby since modifications may be made within the scope of the claims without departing from the spirit thereof.

In FIG. 2 the catalyst valve is shown in an isometric view with one closure element for said valve shown in exploded view for clarity and the other closure element shown in a normal relationship to the remaining elements of the catalyst valve.

Referring now to FIG. 2 of the drawing, a valve body 100 comprising a vertically disposed pipe having an open upper end and a lower end is attached to parallel support members 101 and 102. The upper end of the valve body extends above support members 101 and 102 and the lower end of the valve body extends below said support members 101 and 102. The lower end of valve body 100 is cut such that the lower end of said valve body 100 define two semi-elliptical spaces in allochiral relationship. Flapper vanes 103A and 103B comprising elliptical sections are located such that when said vanes 103A and 103B are in a closed position the semi-elliptical spaces defined by valve body 100 are completely covered. For clarity of detail flapper vane 103A is shown in an exploded view and flapper vane 103B is shown in a closed position. Support members 101 and 102 in a parallel relation comprise vertically disposed plates separated by the width of the valve body 100. Support plate 101 has two holes in horizontal alignment symmetrically disposed upon either side of valve body 100 and support plate 102 has two similar holes in axial alignment with the holes in support plate 101. Bearing rod 104A extending through axially aligned holes is pivotally mounted between support plates 101 and 102 upon one side of valve body 100 and bearing rod 104B extending through axially aligned holes is pivotally supported between support members 101 and 102 upon the other side of the valve body 100. Connecting member 105A, attached to bearing rod 104A at a 90° angle extends downwardly and flapper vane 103A is attached thereto. Connecting member 106A is attached to bearing rod 104A at a 90° angle and is angularly disposed to connecting member 105A. A weight 107A is attached to connecting member 106A at a distance from the bearing rod 104A. The weight 107A is disposed in relation to flapper vane 103A in such a manner that a rotational torque force is imposed upon flapper vane 103A. The rotational torque forces flapper vane 103A against valve body 100 thereby covering the semi-elliptical section formed by the lower part of the valve body 100.

As hereinabove stated, flapper vane 103B is an allochiral analogue of flapper vane 103A. By the same token connecting member 105B, bearing rod 104B connecting member 106B and weight 107B are the allochiral analogues of connecting member 105A, bearing rod 104A, connection member 106A, and weight 107A respectively. It is to be understood that flapper vane 103B operates in a manner analogous to the operation of flapper 103A.

In a fluidized catalytic cracking process wherein a valve such as shown in FIG. 2 and described above is installed for passing catalyst from reactor vessel 15 into stripping zone 42, the inventory of catalyst in reactor vessel 15 exerts a pressure inside valve body 100 against flapper vanes 103A and 103B. The torque force imposed upon the flapper vanes by weights 107A and 107B opposes the pressure imposed by the catalyst. At equilibrium, an increase in the weight of catalyst inventory in reactor vessel 15 will create a pressure inside valve body 100 sufficient to overcome the torque force imposed by weights 107A and 107B. Thus, flapper vanes 103A and 103B will be forced away from valve body 100 and catalyst will pass from reactor vessel 15 through valve body 100 into stripping zone 42. Sufficient catalyst will pass through valve body 100 to reduce the catalyst inventory of reactor vessel 15 until torque force imposed by weights 107A and 107B will close flapper vanes 103A and 103B.

Under actual operating conditions in a fluidized catalytic cracking process wherein catalyst is continually discharging into reactor vessel 15, the pressure exerted by the weight of catalyst inventory will keep flapper vanes 103A and 103B continuously pushed away from valve body 100, thereby allowing a continuous flow of catalyst from reactor vessel 15 to stripping zone 42. The torque force provided by the weights acts in opposition to the pressure exerted by the catalyst inventory such that flapper vanes 103A and 103B are maintained in a position such that the flow of catalyst through valve body 100 is limited essentially to the amount of catalyst entering reaction vessel 15. By selecting the length of connecting members 106A and 106B and weights 107A and 107B, a torque force of known value may be imposed upon flapper vane 103A and 103B. This known torque will then support a certain pressure exerted by the catalyst inventory upon flapper vanes 103A and 103B. Thus, by properly selecting the length of connecting members 106A and 106B, and the weights 107A and 107B a torque force may be provided which is sufficient to support the desired weight of catalyst inventory in reaction vessel 15.

We claim:

1. In a fluidized catalytic cracking process comprising a dilute phase riser reactor, a reaction vessel, a stripping zone below said reaction vessel; a valve means responsive to the weight of catalyst connecting the lower portion of said reaction vessel with the upper portion of said stripping zone, and a regeneration zone, wherein regenerated catalyst and hydrocarbon charge are combined in the lower portion of said riser reactor under catalytic cracking conditions, wherein catalyst and hydrocarbon vapors discharge downwardly from the upper end of said riser reactor into said reaction vessel at a point intermediate to the height of said reaction vessel for separation into a dense phase fluidized catalyst bed and a hydrocarbon vapor phase containing a minor amount of entrained catalyst, wherein hydrocarbon vapor is recovered overhead from said reaction vessel, and wherein catalyst from said dense phase bed is transferred via said valve means from the lower portion of said reaction vessel into said stripping zone at a rate equivalent to the rate catalyst enters said reaction vessel; the improvement which comprises:

a. maintaining, by action of said valve means responsive to the weight of catalyst, a preselected weight inventory of catalyst in said dense phase fluidized bed such that at a bulk density of about 35 lb/cu. ft. the upper surface of said dense phase fluidized catalyst bed is below said riser discharge and at a bulk density of about 18 lb/cu. ft. the upper surface of said dense phase fluidized catalyst bed is above said riser discharge;

b. Charging a fluidization vapor to the lower portion of said reaction vessel at a rate sufficient to maintain a superficial vapor velocity within said dense phase fluidized bed from about 1.5 ft/sec. to about 3.4 ft/sec. and to maintain a bulk density of said dense phase fluidized catalyst bed within the range of from about 35 lb/cu. ft. to about 18 lb/cu. ft.; and c. adjusting the flow of fluidization vapor for adjusting the bulk density of said dense phase fluidized catalyst bed within the range of about 35–18 lb/cu. ft., and obtaining a selected conversion of hydrocarbon within said reaction vessel.

2. The method of claim 1 wherein, at a bulk density of about 35 lb/cu. ft. the upper surface of said dense phase fluidized catalyst bed is about 3 to 7 feet below the downwardly directed discharge of said riser reactor, and wherein, at a bulk density of about 18 lb/cu. ft. the upper surface of said dense phase fludized catalyst bed is above the downwardly directed discharge of said riser reactor.

3. The method of claim 2, wherein hydrocarbon conversion within said reaction vessel is controlled by controlling the flow of said fluidization vapor for maintaining a superficial vapor velocity within said dense phase fluidized catalyst bed within the range of from about 2 ft/sec to about 3.4 ft/sec for maintaining a bulk density of said dense phase fluidized catalyst within the range of from about 35 lb/cu. ft. to about 18 lb/cu. ft. and maintaining contact of hydrocarbon vapor with catalyst for obtaining the desired hydrocarbon conversion within said reaction vessel.

4. The method of claim 3, wherein flow of fluidization vapor is increased for obtaining increased hydrocarbon conversion within said reaction vessel and wherein flow of fluidization vapor is decreased for obtaining decreased hydrocarbon conversion within said reaction vessel.

5. The method of claim 3, wherein a fresh feed riser reactor discharges into said reaction vessel, wherein a recycle feed riser reactor discharges downwardly into said reactor vessel at an elevation from about 7 to 12 feet below said fresh feed riser reactor discharge, wherein, at a dense phase fluidized bed bulk density of about 35 lb/cu. ft. the surface of said dense phase fluidized catalyst bed is about 3 to 7 feet below the discharge of said recycle riser reactor, and wherein, at a dense phase fluidized bed bulk density of about 18 lb/cu. ft., the surface of said dense phase fluidized catalyst bed is about 3 to 7 feet below the discharge of said fresh feed riser.

6. In a fluidized catalytic cracking process comprising a reaction vessel; a dilute phase vertical riser reactor in communication with said reaction vessel; a stripping zone below said reaction vessel, a counterweighted check valve communicating between the bottom of said reaction vessel and the upper portion of said stripping zone; and a regeneration zone, wherein regenerated catalyst and hydrocarbon charge are combined in the lower portion of said riser reactor under catalytic cracking conditions, wherein catalyst and hydrocarbon vapors discharge downwardly from the upper end of said riser reactor into said reaction vessel at a point intermediate to the height of said reaction vessel for separation into a dense phase fluidized catalyst bed and a hydrocarbon vapor phase, wherein hydrocarbon vapor is recovered overhead from said reaction vessel, and wherein catalyst from said dense phase bed is transferred via said check valve from the lower portion of said reaction vessel into said stripping zone at a rate equivalent to the rate catalyst enters said reaction vessel; the improvement which comprises:

a. maintaining, by action of said counterweighted check valve, a preselected weight inventory of catalyst in said dense phase fluidized bed such that at a bulk density of about 35 lb/cu. ft. the upper surface of said dense phase fluidized catalyst bed is below said riser discharge, and at a bulk density of about 18 lb/cu. ft. the upper surface of said dense phase fluidized catalyst bed is above said riser discharge;

b. fluidizing said dense phase fluidized bed with fluidization vapor at a rate sufficient to maintain a superficial vapor velocity of from about 1.5 ft/sec. to about 3.4 ft/sec. and a bulk density of from about 35 lb/cu. ft. to about 18 lb/cu. ft. within said dense phase fluidized bed.

c. controlling the flow of said fluidization vapor within the range of step (b) for obtaining a desired conversion of hydrocarbon within said reaction vessel.

7. The method of claim 6 wherein, at a bulk density of about 35 lb/cu. ft. the upper surface of said dense phase fluidized catalyst bed is about 3 to 7 feet below said downwardly directed riser discharge, and wherein at a bulk density of about 18 lb/cu. ft. the upper surface of said dense phase fluidized catalyst bed is above said riser discharge.

8. The method of claim 7 wherein, the flow of fluidization vapor is increased within the superficial space velocity limits of about 1.5 to 3.4 ft/sec. for decreasing bulk density of said dense phase catalyst bed, increasing contact of hydrocarbon vapor with said dense phase catalyst bed, and increasing conversion of hydrocarbon within said reaction vessel.

9. The method of claim 8 wherein, flow of fluidization vapor is increased for increasing hydrocarbon conversion within said reactor, and wherein flow of fluidization vapor is decreased for decreasing hydrocarbon conversion within said reactor.

10. The method of claim 9 wherein, a fresh feed riser reactor discharges into said reaction vessel, wherein a recycle feed riser discharges downwardly into said reactor vessel at an elevation from about 7 to 12 feet below said fresh feed riser reactor discharge, wherein, at a dense phase fluidized catalyst bed bulk density of about 35 lb/cu. ft. the surface of said dense phase fluidized catalyst bed is about 3 to 7 feet below the discharge of said recycle riser, and wherein, at a dense phase fluidized catalyst bed bulk density of about 18 lb/cu. ft. the surface of said dense phase fluidized catalyst bed is about 3 to 7 feet below the discharge of said fresh feed riser.

* * * * *